(12) United States Patent
Hakki et al.

(10) Patent No.: US 6,549,311 B1
(45) Date of Patent: Apr. 15, 2003

(54) WAVE DIVISION MULTIPLEXING CHANNEL TELEMETRY BY PHASE MODULATION

(75) Inventors: Basil Wahid Hakki, Allentown, PA (US); Robert W. Smith, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,716

(22) Filed: Jul. 14, 1999

(51) Int. Cl.[7] .............................................. H04B 10/04
(52) U.S. Cl. ...................... 359/124; 359/109; 359/183
(58) Field of Search ................................ 359/124, 183, 359/111, 109, 114, 115, 133, 180, 181, 182

(56) References Cited

U.S. PATENT DOCUMENTS

| | | | | |
|---|---|---|---|---|
| 4,933,929 A | * | 6/1990 | Tajima ........................... | 370/3 |
| 5,953,139 A | * | 9/1999 | Nemecek et al. ........... | 359/124 |
| 5,963,567 A | * | 10/1999 | Veselka et al. ............... | 372/21 |
| 6,005,702 A | * | 12/1999 | Suzuki et al. ................ | 359/183 |
| 6,023,362 A | * | 2/2000 | Walker et al. ............... | 359/180 |
| 6,252,693 B1 | * | 6/2001 | Blauvelt ...................... | 359/183 |
| 6,310,709 B1 | * | 10/2001 | Bergano ..................... | 359/183 |

OTHER PUBLICATIONS

"Phase Modulation to Amplitude Modulation Conversion of CW Laser Light in Optical Fibers", Electronics Letters, Apr. 10, 1986, vol. 22 No. 8, pp. 409–411.

Hakki, Basil W., "Dispersion of Microwave–Modulated Optical Signals", IEEE Journal of Lightwave Technology, Mar. 1993, vol. 11 No. 3, pp. 474–480.

Baney, Douglas M. et al., "Power Spectrum Measurement of a Modulated Semiconductor Laser Using an Interferometric Self–Homodyne Technique: Influence of Quantum Phase Noise and Field Correlation", IEEE Journal of Quantum Electronics, Oct. 1989, vol. 25 No. 10, pp. 2106–2112.

* cited by examiner

*Primary Examiner*—Brent A. Swarthout
(74) *Attorney, Agent, or Firm*—Gregory J. Murgia

(57) ABSTRACT

A wave division multiplexing system in which low frequency intensity modulation of the optical channels is avoided in order to reduce or substantially prevent interchannel cross-talk of low frequency telemetry signals by phase modulating the low frequency telemetry signal so as to recover the transmitted signal at the receiver. The system includes multiple transmitters and receivers. Each transmitter includes an optical source, such as a laser, a radio frequency generator having a low frequency telemetry signal impressed thereon, and an optical phase modulator. The phase modulated low frequency telemetry signal generated by each transmitter is combined using a multiplexer before being amplified and transmitted through a single optical fiber. A demultiplexer receives the transmitted signal and separates it into respective optical channels based on the particular frequency of each transmitter. Respective signals for each optical channel are transmitted to an associated receiver. Each receiver includes a splitter for tapping off a portion of power into a first portion and a second portion. A data recovery device reestablishes data information from the first portion of power, while an interferometer and detector are used to recover the low frequency telemetry information from the second portion of power.

8 Claims, 3 Drawing Sheets

WAVE DIVISION MULTIPLEXING CHANNEL TELEMETRY BY PHASE MODULATION

FIELD OF THE INVENTION

The present invention relates to optical transmissions, and in particular, reducing inter-channel cross-talk among low frequency telemetry signals in a wave division multiplexing (WDM) system.

DESCRIPTION OF RELATED ART

Wave division multiplexing (WDM) systems are used to transmit multiple channels independently of one another through an optical fiber. Each channel has a unique optical frequency. At a receiving device the transmitted channels are demultiplexed based on the particular optical frequencies associated with the individual channels.

A problem encountered in conventional WDM systems is inter-channel cross-talk among low frequency telemetry signals, that is, telemetry signals having a frequency of approximately less than 100 kHz. Inter-channel cross-talk occurs in the optical amplifier as a result of mixing of the low frequencies. Mixing occurs when one or more optical signals are used as pumps to provide gain in the optical amplifier. In particular, if the low frequency telemetry optical signal intensity modulates the optical data channel it effectively modulates the gain of the amplifier, thereby resulting in mixing of the low frequency signals carried by the various channels. Because of mixing of the low frequency telemetry signals, the optical channels can not be isolated by the demultiplexer at the receiving end.

It is therefore desirable to avoid low frequency intensity modulation of the data channels in order to reduce or prevent inter-channel cross-talk of low frequency telemetry signals.

SUMMARY OF THE INVENTION

The wave division multiplexing system in accordance with the present invention solves the above noted inter-channel cross-talk problems associated with intensity modulated low frequency telemetry signals in conventional WDM systems, by phase modulating the low frequency telemetry signals.

The wave division multiplexing system includes a plurality of transmitters. Each transmitter has an optical source, such as a laser, for generating an optical signal and a radio frequency signal generator for producing a radio frequency signal having a low frequency telemetry signal impressed thereon. An optical phase modulator receives the optical signal and the radio frequency signal carrying the low frequency telemetry signal, and generates a phase modulated output optical signal. The phase modulated output signal generated by each of a plurality of transmitters are combined using a multiplexer and amplified before being transmitted over a single optical fiber. The frequency of modulation and phase shift of the optical signal are preferably selected to substantially. avoid phase modulation/amplitude modulation (PM/AM) conversion in a dispersive filter. After being transmitted over the optical fiber, a demultiplexer isolates the optical channels of each respective transmitter which are transmitted to respective receivers. Each receiver includes a splitter for tapping off from each demultiplexed optical channel a second portion of power from a first portion of power. A data recovery device reestablishes the data information based on the first portion of power, while an interferometer receives the second portion of power and together with a detector recovers the low frequency telemetry signal for the optical channel of the respective transmitter.

In addition, the present invention is directed to a method for using the wave division multiplexing system described above. A radio frequency signal is generated and a low frequency telemetry signal is impressed thereon, thereby generating a radio frequency output signal. The optical signal of each transmitter is phase modulated using the respective radio frequency output signal to produce phase modulated output optical signals that are multiplexed into a single signal before being transmitted over an optical fiber. A demultiplexer receives the multiplexed signal and separates it into respective optical channels. Then the data information and low frequency telemetry signal for each particular frequency is recovered. Specifically, a portion of the power is split off into a first portion and a second portion. The data information is reestablished from the first portion power using a data recovery device, while the low frequency telemetry signal is reestablished using an interferometer and detector.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

In accordance with the present invention inter-channel cross-talk of low frequency telemetry signals, that is, telemetry signals having a frequency less than approximately 100 kHz, can be prevented or substantially reduced by carrying the low frequency telemetry as an optical phase modulation superimposed on an optical carrier.

Figure 1:
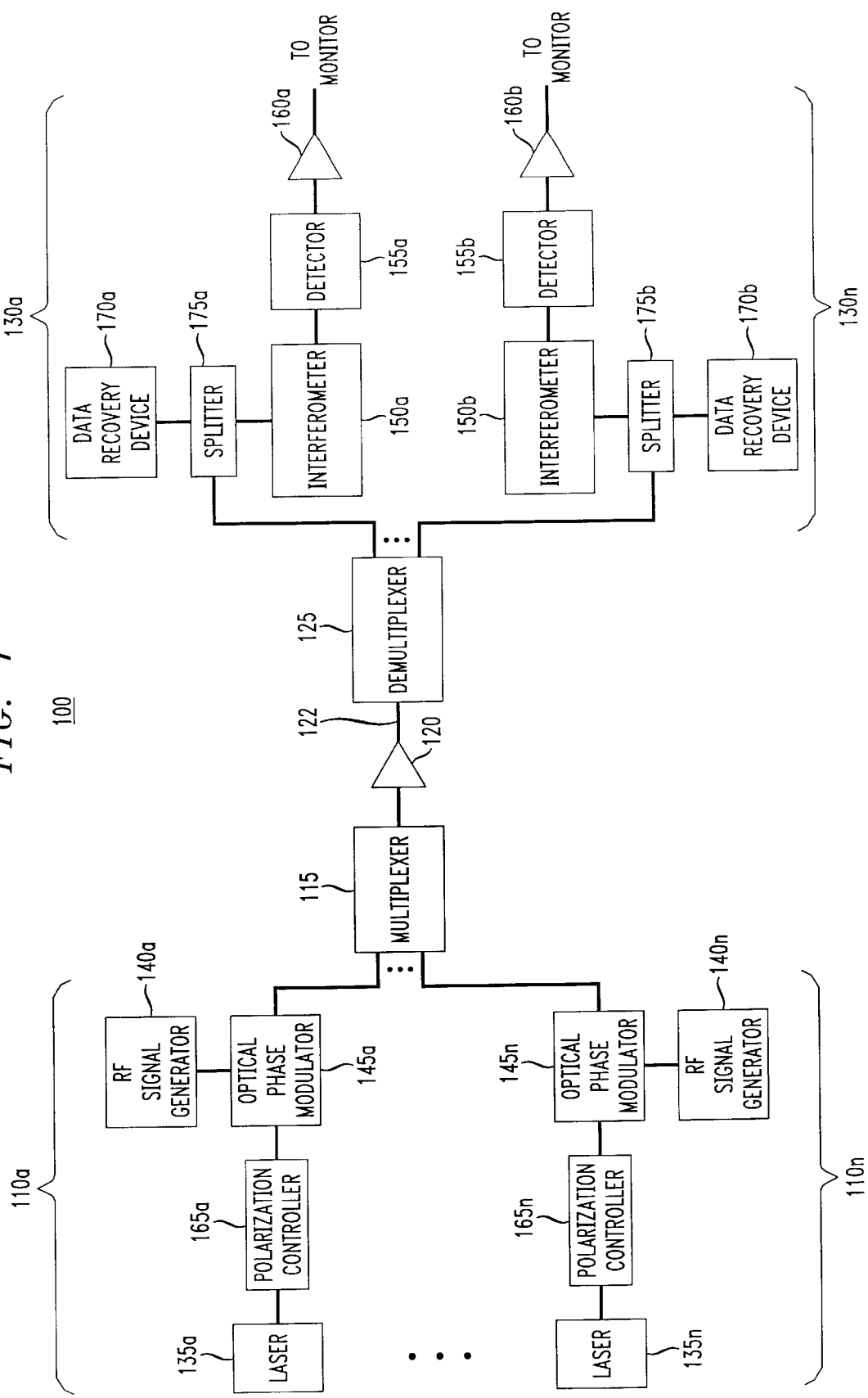
FIG. 1 is an exemplary wave division multiplexing system in accordance with the present invention.

An exemplary wave division multiplexing system in accordance with the present invention is shown schematically in FIG. 1. The system 100 includes a plurality of transmitters 110a, . . . , 110n, a multiplexer 115, an amplifier 120, a demultiplexer 125, and a plurality of receivers 130a, . . . , 130a, where n is a positive integer greater than or equal to two. Each transmitter 110a, . . . , 110a preferably has the same construction, and thus the configuration of only one transmitter 110a will be described in detail. Transmitter 110a includes a laser source 135a, operating at some wavelength $\lambda$ and carrying high speed information in either digital or analog format. The lasers used in each transmitter may be the same or different from one another. A low frequency telemetry signal is applied to a radio frequency (RF) signal generator 140. Modulator 145 phase modulates the optical signal with the RF signal to which the low frequency telemetry signal has been applied. The frequency of modulation and the phase shift amplitude of the optical signal are preferably selected to avoid phase modulation/ amplitude modulation (PM/AM) conversion in a dispersive fiber. In one embodiment, a polarization controller 165a may be interposed between the laser 135a and optical phase modulator 145a to launch the optical signal along the c-axis of the modulator so as to avoid polarization rotation and spurious intensity modulation. A polarization maintaining fiber may alternatively be used to connect the laser and the phase modulator, thereby eliminating the need for the polarization controller 165a. The optical signals or channels produced by each transmitter 110a, . . . , 110a are combined via a multiplexer 115 into a single signal and amplified by an amplifier 120 before being transmitted over an optical fiber 122.

Demultiplexer 125 receives the transmitted signal and separates the optical channels based on their particular optical frequencies. The respective output optical channels are processed by receivers 130a, . . . , 130a. All of the receivers preferably have the same construction, and thus the configuration of only one receiver 130a will be described in detail. Receiver 130a includes a splitter 175a, a data recovery device 170a, an interferometer 150a, such as an HP 11980 fiber Mach-Zehnder interferometer, a detector 155a, and an electrical amplifier 160a. Splitter 175a splits off a portion of the power. The first portion is received by the data recovery device 170a that recovers the data information, while the second portion passes through the interferometer 150a and detector 155a to recover the telemetry information. Specifically, telemetry information is recovered at the interferometer 150a by delaying the phase of one arm relative to the other by a period τ. Detector 155a receives the signal at the modulated frequency that carries the low frequency telemetry signal and detects the specific frequency of the associated transmitter. The amplified signal output from the amplifier 160a can be displayed on a monitor. Interferometer 150a preferably employs a conventional self-homodyne technique to down convert the optical PM signal back to the original base-band signal. Detector 155 may contain filtering elements that are tuned to the frequency of the RF signal source that drives the modulator, as is known to those in the field.

As long as the optical phase is modulated sinusoidally, the microwave spectrum of the detector can be understood in terms of the uncorrelated homodyne interference of a sinusoidally phase modulated optical signal, as described in the publication by D. M. Baney and P. B. Gallion, "Power Spectrum Measurement of a Modulated Semiconductor Laser Using an Interferometric Self Homodyne Technique: Influence of Quantum Phase Noise and Field Correlation", IEEE Journal of Quantum Electronics, vol. 25 (October 1989), pp. 2106–2112, incorporated herein by reference. The uncorrelated homodyne interference of a sinusoidally phase modulated optical signal produces a spectrum represented as $$P(f) = P_B + C \sum_{N=0}^{\infty} J_N(\beta)^2 \frac{\delta v^2}{\delta v^2 + (f - Nf_m)^2} \quad (1)$$

where, $P_B$ is the background noise power;

$J_N(\beta)$ are Bessel functions;

C is a constant that depends on the optical power level and the measurement bandwidth;

f is the frequency;

$f_m$ is the phase modulation frequency of the optical source;

β is the phase modulation index; and

δV is the line width of the laser.

In order for the interference to be uncorrelated, the coherence length of the laser must be less than the difference in lengths of the two arms of the interferometer. For instance, if an HP11980 interferometer is used having a length of 724 meters and a distributed feedback laser with a line width of 2.8 MHz generating a coherence length of 23 meters is produced, since the coherence length is significantly less than the differential lengths of the interferometer, the microwave spectrum is represented by the uncorrelated homodyne interference pattern in equation (1). On the other hand, an external cavity laser having a line width of 80 kHz, and a coherence length of 940 meters in the fiber, produces a sharp interference pattern that can not be interpreted based on equation (1).

Figure 2:
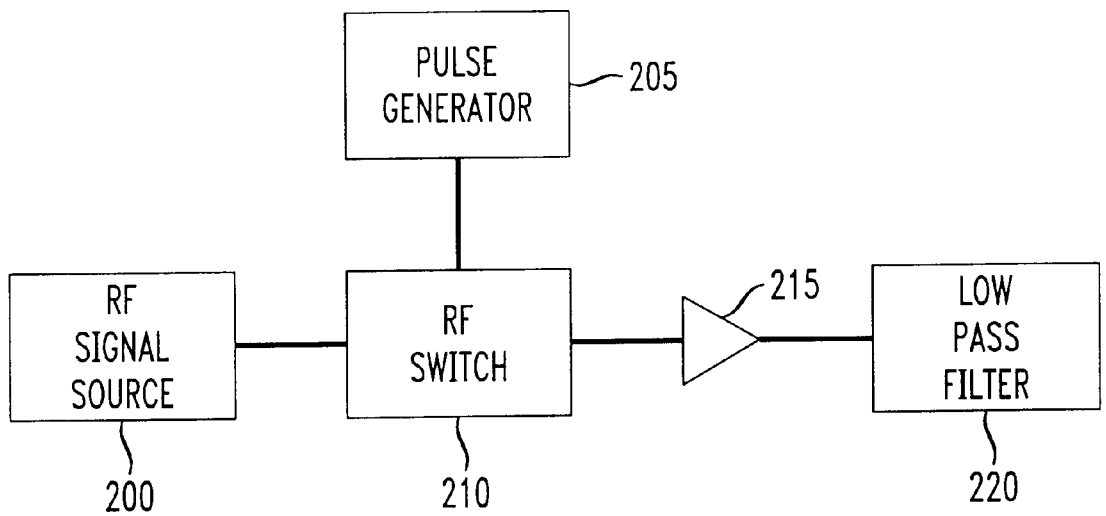
FIG. 2 is an exemplary radio frequency generator of the wave division multiplexing system in FIG. 1.

FIG. 2 is a circuit diagram of an exemplary RF signal generator 140a. An RF signal source 200 carrying a low frequency telemetry signal is connected to an RF switch 210, which is driven by a pulse generator 205. The signal output from the RF switch 210 is amplified in an electrical amplifier 215 and passed through an optical low pass filter 220 to eliminate harmonics due to distortions in the amplifier.

Figure 3:
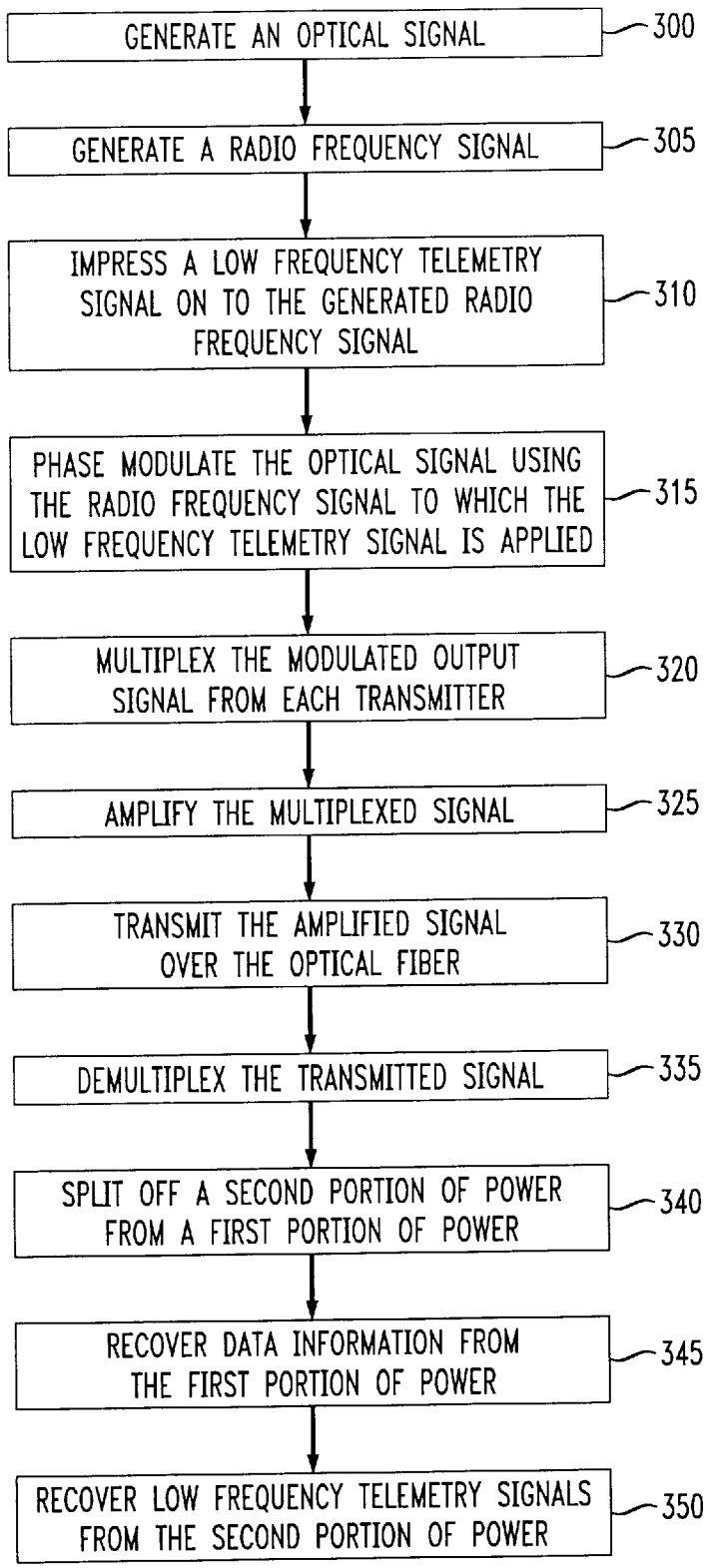
FIG. 3 is an exemplary flow chart of the method of using the wave division multiplexing system in FIG. 1.

FIG. 3 is an exemplary flow chart of the operation of the wavelength division multiplexing system in FIG. 1. Initially, in steps 300, 305 each transmitter 110a, . . . ,110n generates an optical signal and an RF signal. In steps 310, 315 a low frequency telemetry signal is impressed on the generated RF signal and each modulator 145a, . . . , 145n modulates the optical phase of the respective optical signal by the RF generated signal to which the low frequency telemetry signal is applied. Then, in steps 320–330, the output optical signal from each transmitter 110a, . . . , 110n is multiplexed and amplified by multiplexer 115 and amplifier 120, respectively, before being transmitted over the optical fiber 122. After transmission the signal is demultiplexed, in step 335, by the demultiplexer 125 into separate optical channels. Each optical channel signal is received by a respective receiver 130a, . . . , 130n. In step 340, the power in each of the receivers 130a, . . . , 130n is split off by respective splitters 175a, . . . , 175n into a first portion of power from which data information is recovered, in step 345, by respective data recovery devices 170a, . . . , 170n, and a second portion of power from which low frequency telemetry signals are recovered, in step 350, via respective interferometers 150a, . . . , 150n and detectors 155a, . . . , 155n.

Therefore, in the WDM system in accordance with the present invention, a low frequency telemetry signal can be impressed on the optical signal with negligible, if any, intensity modulation of the optical power that could otherwise give rise to low frequency inter-channel cross-talk in the optical amplifier. As a result, the low frequency telemetry signal may be readily recovered at the receiver.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A wave division multiplexing system comprising:

a plurality of transmitters, each transmitter comprising
an optical source which generates an optical signal,
a radio frequency generator having a low frequency telemetry signal impressed thereon, said radio frequency generator producing a generated radio frequency signal, and
an optical phase modulator which receives the optical signal produced by an optical source and said generated radio frequency signal, said optical phase modulator generating a phase modulated optical signal at a particular modulation frequency;

a multiplexer which receives and combines said phase modulated optical signal generated by each of said transmitters;

a demultiplexer for isolating the output optical signal of each transmitter; and a plurality of receivers, each of which receives a respective optical signal of a transmitter, each receiver comprising
a splitter for tapping off from the output optical signal of a respective transmitter a second portion of power from a first portion of power,
a data recovery device receiving the first portion of power and recovering the data information,
an interferometer receiving the second portion of power, and
a detector receiving the output of said interferometer and detecting the particular frequency of the associated transmitter.

2. A wave division multiplexing system in accordance with claim 1, wherein said optical source is a laser.

3. A wave division multiplexing system in accordance with claim 1, wherein each transmitter further comprises a polarization controller disposed between said optical source and said optical phase modulator, said polarization controller operating on the optical signal to substantially prevent polarization rotation and spurious intensity modulation.

4. A wave division multiplexing system in accordance with claim 1, wherein said radio frequency generator comprises:

a radio frequency signal source for generating a radio frequency signal;

a radio frequency switch which receives said radio frequency signal; and a pulse generator for driving said radio frequency switch.

5. A wave division multiplexing system in accordance with claim 4, wherein said radio frequency generator further comprises:

an amplifier for amplifying the output of said radio frequency switch and generating an amplified signal; and a low pass filter for filtering the amplified signal.

6. A wave division multiplexing system in accordance with claim 1, wherein the particular frequency of modulation and a phase shift are selected to substantially avoid phase modulation/amplitude modulation conversion in a dispersive filter.

7. A method of using a wave division multiplexing system that substantially eliminates inter-channel cross-talk among low frequency telemetry, comprising the steps of:

generating an optical signal for each of a plurality of transmitters;

producing a radio frequency signal for each of said plural transmitters using a radio frequency signal generator;

applying a low frequency telemetry signal to each of the radio frequency signals and generating radio frequency output signals;

phase modulating the optical signal of each of said plural transmitters using said generated radio frequency output signal to produce phase modulated output signals;

multiplexing said phase modulated output optical signals generated by each of said plural transmitters;

demultiplexing the multiplexed signal into isolated optical channels for each of the plural transmitters; and recovering said low frequency telemetry signal and the data information by
tapping off a portion of power of each isolated optical channel for each of the plural transmitters into a first portion of power and a second portion of power,
reestablishing data information from the first portion of power using a data recovery device, and
reestablishing the low frequency telemetry signals from the second portion of power using an interferometer and a detector.

8. A method in accordance with claim 7, further comprising the step of amplifying the multiplexed signal.

* * * * *